United States Patent
Muller et al.

[15] 3,663,116
[45] May 16, 1972

[54] CANTILEVERED MACHINE PART

[72] Inventors: Theo Muller, Pattscheid; Otto Feller, Burscheid, both of Germany

[73] Assignee: Goetzewerke Friedrich Goetze AG, Burscheid, Germany

[22] Filed: Apr. 22, 1970

[21] Appl. No.: 30,860

[30] Foreign Application Priority Data

Apr. 23, 1969 Germany..................P 19 20 598.2

[52] U.S. Cl..........................................................408/143
[51] Int. Cl..........................................................B23b 29/03
[58] Field of Search................................90/11 A; 408/143

[56] References Cited

UNITED STATES PATENTS

| 3,230,833 | 1/1966 | Shurtliff | 90/11 R |
| 3,292,237 | 12/1966 | Fisher | 29/95 |
| 2,953,951 | 9/1960 | Carlstedt | 77/68 |
| 2,845,823 | 8/1958 | Carlstedt | 77/55 R |
| 3,499,350 | 3/1970 | Hahn | 77/58 B |
| 3,499,351 | 3/1970 | Jacobson | 77/58 B |

FOREIGN PATENTS OR APPLICATIONS

| 1,029,675 | 5/1966 | Great Britain | 77/58 B |
| 79,745 | 11/1955 | Netherlands | 77/58 B |

*Primary Examiner*—Gerald A. Dost
*Attorney*—Spencer and Kaye

[57] ABSTRACT

A boring bar inherently damping torsional vibrations and having an elongated outer jacket and a core arranged within the jacket, there being an energy-consuming material arranged between the inner surface of the jacket and the outer surface of the core for damping torsional displacement between the jacket and the core.

13 Claims, 2 Drawing Figures

PATENTED MAY 16 1972

3,663,116

Inventors

Theo MÜLLER &
Otto FELLER

By Spencer & Kaye

Atty:

CANTILEVERED MACHINE PART

BACKGROUND OF THE INVENTION

The present invention relates to a device for the damping primarily of torsional vibrations in cantilevered machine parts, especially in tool carriers clamped securely at one end, such as boring bars and the like. Damping is achieved using an energy-consuming material.

Boring bars of steel are used for the internal working of hollow bodies. Such tool carriers are clamped securely at one end. They may be either solid or tubular bars. The boring bit is secured in the free end of such bars. During the removal of chips by the boring bit during a turning operation, the cutting forces vary and this sets the boring bar into vibration. The size of such vibrations is dependent on the length and stiffness of the boring bar.

Especially large torsional vibrations occur when internally working non-circular hollow bodies, such as for example packets of piston rings. The special internal circumferential contour possessed by piston rings gives especially large cutting force variations. Also giving rise to vibrations during such working operations is the requisite oscillatory movement of the entire boring bar itself in the horizontal or vertical direction. The best possible reduction of vibrations in a boring bar becomes even more important in the working of precision articles such as piston rings, because, besides there being a necessity for high tolerance dimensions on the inner circumferential surfaces to obtain exact stress distributions, it is necessary that such surfaces be very smooth in order to prevent stress concentrations and increased danger of fracture.

In order to damp out vibrations in boring bars, it has already been proposed to interpose discs of polyvinyl chloride at the clamped end of the boring bar. This technique is represented by the disclosure in West German Pat. No. 1,238,311. However, it has not been possible, using such structure, to eliminate the oscillations arising from the elasticity of the boring bar material itself.

Another attempt to damp vibrations in rotating and stationary, cantilevered cutting tools is shown in the article "Vibration Damper Ups Machining Productivity" which appeared in the Sept. 1967 issue of Machinery beginning at page 91. Characteristic of this damping structure is an inertial mass frictionally and elastically supported in a hollow cylinder. The axial interposition of such vibration dampers in boring bars increases their lengths substantially, so that the reaction forces occurring at the cutting tool act over a longer effective lever arm to increase the susceptibility of the boring bar to oscillations.

SUMMARY OF THE INVENTION

An object of the present invention, therefore, is to provide a simple and effective method and structure for damping torsional vibrations in cantilevered machine parts, especially in boring bars clamped securely at one end, without in consequence enlarging the external dimensions and/or mass of the boring bar itself.

This as well as other objects which will become apparent in the discussion that follows are achieved, according to the present invention, by providing a device having an outer jacket encompassing an internal, torsionally stiff core, with an energy-consuming layer situated between the outer jacket and the inner core. The outer jacket of the machine part of the present invention corresponds, for example, to conventionally used hollow boring bars that are clamped securely at one end and provided with a boring bit at an axially opposite end. By connecting the torsionally less-rigid jacket, which, because of alternating, circumferentially directed loading, is subjected to a continually varying torsional stressing, through an energy-consuming intermediate layer with an inner, torsionally relatively more rigid core, the occurring torsional vibrations and also for the most part the accompanying horizontal and vertical vibrations, are damped out, insofar as they are not superimposed of necessity on the entire tool carrier to obtain some special forming of the workpiece.

Preferably, the inner core extends over almost the entire length of the tool carrier, in order to obtain an optimum damping effect. Furthermore, the inner core may be connected at the clamping end of the tool carrier securely by welding or the like to the outer jacket, in order to prevent rotation of the core in the externally clamped jacket. Since the possible angle of twist of the jacket will be largest at the end carrying the tool, for example the boring bit, thence going to zero at the opposite clamping end, it is advantageous to taper the inner core toward that end of the tool carrier carrying the tool, in order that a substantially uniform loading of the intermediate layer in shear be obtained. According to another development of the present invention, the surface elements of the inner surface of the jacket run parallel to the corresponding elements in the conically tapered outer surface of the core. This gives a uniform thickness to the intermediate layer over the entire length of the tool carrier of the invention and, with the uniformly distributed shear loading, provides a uniformly distributed damping action.

According to yet another development of the present invention, the free end of the core and/or the opposing inner end-surface of the jacket is given a spherical shape in order to provide a continuous transition from the end surfaces to the conically tapering surfaces. This prevents stress concentrations in the portion of the energy-consuming layer situated at the tool-carrying end of the tool carrier of the present invention.

The layer of energy-consuming material provided between the core and jacket of the machine part of the present invention is made preferably of natural or synthetic rubber, since internal friction in such material can completely transform vibrational energy into heat. With rubber there is the additional advantage that it is possible to inject the intermediate layer into the space between the jacket and core. This provides an especially simple manufacture of the machine part of the present invention and a uniform distribution of the intermediate layer as required for damping. In order to prevent the inclusion of air bubbles in the intermediate layer, a further development of the present invention has, in addition to an injection opening in its jacket, also one or more venting holes.

Even though it would be possible to press previously vulcanized rubber into the space between jacket and core in the machine part of the present invention, it is of advantage for the present invention to inject raw, liquid rubber into the space and to vulcanize the rubber in place under pressure. Thus, while it would be possible to obtain a force-transmitting relationship between the jacket, intermediate layer, and core simply by designing the intermediate layer to be under compression when in place and thus relying on frictional forces, the vulcanizing of the intermediate layer in place leads to a vulcanized bonding of the intermediate layer to the core and to the jacket and guarantees a positive transmission of the rotational vibrations especially from the jacket into the vulcanized, oscillation-absorbing, rubber intermediate layer.

According to another development of the present invention, the intermediate layer is pre-stressed in the circumferential direction. This can be especially easily effected by rotating the core relative to the jacket a certain degree following injection and vulcanizing of the intermediate layer. While holding this relative rotation, the jacket and core are, for example, welded together at the clamping end of the machine part of the invention to provide a locking in of such pre-stressing. Rubber pre-stressed in the circumferential direction in this way exhibits an especially high ability to damp vibrations.

According to yet another development of the present invention, the tool carrier has a bore extending through its entire length for the conduction of a coolant. By passing a coolant through the core to the tool, not only is the tool itself cooled but also the heat developed in the intermediate layer by the transformation of the vibrational energy is carried away.

DESCRIPTION OF THE PREFERRED EMBODIMENTS

Figure 1:
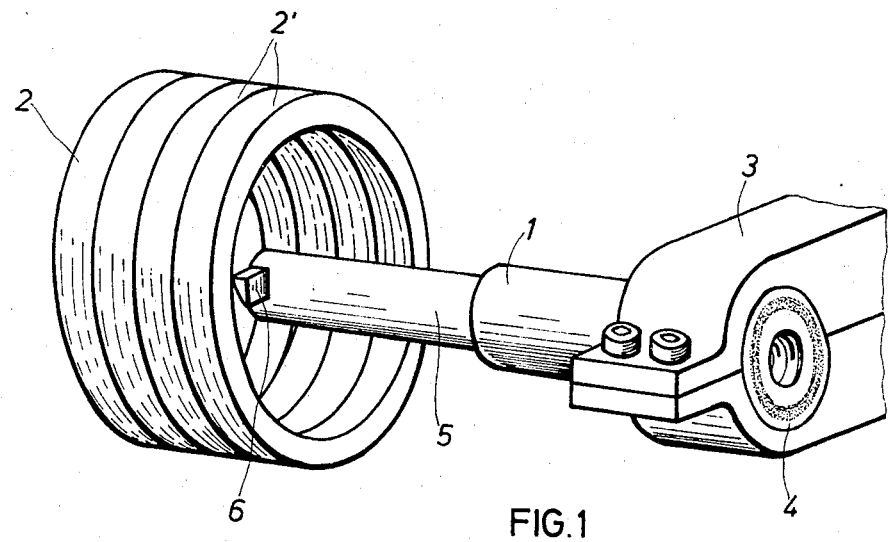
FIG. 1 is a simplified, perspective representation of a machine part of the present invention being used as a boring bar.

Referring to FIG. 1, the boring bar 1 is clamped at one end in holder 3 and extends to within a packet 2 of piston rings 2'. For the purpose of better illustrating the essentials of the present invention, the means for holding the piston rings 2' in packet 2 have been omitted from the drawing. Holder 3 may be mounted to means for oscillating the entire boring bar as a function of the rotational speed of the piston ring packet in order to provide a desired internal contour to the rings in the packet. It would be understood by those skilled in the art that this showing of FIG. 1 is only one of many situations in which a boring bar according to the present invention could be used. For example, holder 3 could also be mounted in a lathe tool post with the boring bar 1 extending into a hollow workpiece held in the chuck of a lathe, such as shown in FIG. 1 on page 134 of "Lathe Work," Machine Shop Series, Delmar Publishers, Inc., Albany, New York, 1946.

The boring bar 1 of FIG. 1 has an enlarged diameter at its clamping end 4. End 4 is clamped tightly in holder 3, so that torques arising from the reaction forces at the boring bit 6 can not rotate the boring bar in the holder. Boring bit 6 is secured at the free end 5 of the thus-cantilevered boring bar 1.

Figure 2:
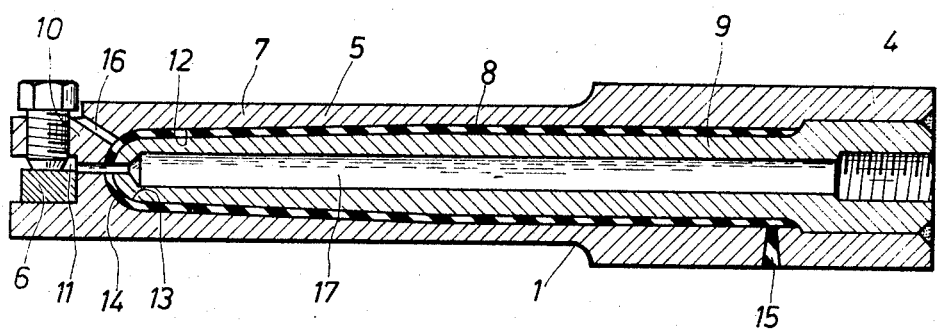
FIG. 2 is a longitudinal cross section through a boring bar according to the present invention.

FIG. 2 shows boring bar 1 in more detail. The structure for damping vibrations is achieved by separating the boring bar into an outer steel jacket 7, an intermediate, energy-consuming layer 8 of rubber, and an inner core 9. Core 9 can likewise be of steel. Core 9 and jacket 7 are welded together at clamping end 4. At the location of the weld, no relative twist can occur between the core 9 and the jacket 7. The tip 10 of the free end of the boring bar has a groove 11 to receive the boring bit 6. A set screw holds the boring bit in place. Core 9 is torsionally stiffer than the jacket 7. It is situated centrally within the jacket 7 almost over the entire length of the jacket. Approximately half of the core 9 (that half nearest the boring bit) tapers toward the boring bit. The internal surface 12 of the jacket opposing the tapered portion of the core has the same conical angle as does the taper of the core. Opposing surface elements of the conical portions of the core and jacket are consequently parallel. The tip 13 of core 9 and the inner tip surface 14 of the jacket 7 are spherically shaped.

For the purpose of placing the rubber layer 8 between the jacket 7 and the core 9, an injection hole 15 is provided in the jacket 7 at the clamping end 4. An air vent 16 is located at the opposing tip 10.

Besides placement of layer 8 using injection, it is also possible to begin by sliding a pre-formed rubber layer onto the core 9. For this method, it is preferred to have the taper extend over the entire lengths of the outer surface of the core and the inner surface of the jacket. The core is pushed into the jacket until a desired pre-compression is reached in the rubber layer 8, such that the frictional forces are large enough to prevent slippage at the surfaces of layer 8. An appropriate jig maintains this pre-compression until the welding shown in FIG. 2 has been done.

Rubber layer 8 has a substantially uniform thickness over its entire length. FIG. 2 is to scale in an example of the invention. A rubber layer thickness of 2 to 3 mm is used for an outer diameter of free end 5 of 40 mm. A preferred pre-stress is obtained by rotating core 9 5° of arc relative to jacket 7 before welding.

Passing axially along the entire length of core 9 and opening at the tip 10 is a coolant bore 17, which serves to direct coolant onto the upper surface of the boring bit 6 and to provide cooling to carry away heat generated in the intermediate layer 8.

It will be understood that the above description of the present invention is susceptible to various modifications, changes and adaptations, and the same are intended to be comprehended within the meaning and range of equivalents of the appended claims.

We claim:

1. A torsion damping arrangement, comprising, in combination:
   a. an elongated generally tubular jacket;
   b. means at one end of said jacket for enabling the same to be secured to a support;
   c. means at the other end of said jacket for securing a work tool thereto;
   d. an elongated torsionally stiff core arranged in said tubular jacket, said core and said jacket being fixedly secured together at said one end of said jacket; and
   e. means forming an energy-absorbing layer arranged in force-transmitting relationship between and contacting the inner surface of said jacket and the outer surface of said core.

2. An arrangement as claimed in claim 1, the length of said core being almost equal to the length of said jacket.

3. An arrangement as claimed in claim 1, said layer being in a prestressed state.

4. A torsion damping arrangement, comprising, in combination:
   a. an elongated generally tubular jacket;
   b. means at one end of said jacket for enabling the same to be secured to a support;
   c. means at the other end of said jacket for securing a work tool thereto;
   d. an elongated torsionally stiff core arranged in said tubular jacket, with said core tapering from said one end toward said other end; and
   e. means forming an energy-absorbing layer arranged in force-transmitting relationship between and contacting the inner surface of said jacket and the outer surface of said core.

5. An arrangement as claimed in claim 4, the surfaces of said jacket opposing the taper of said core tapering with taper equal to that of said core.

6. A torsion damping arrangement, comprising in combination:
   a. an elongated generally tubular jacket;
   b. means at one end of said jacket for enabling the same to be secured to a support;
   c. means at the other end of said jacket for securing a work tool thereto;
   d. an elongated torsionally stiff core arranged in said tubular jacket, said core at said other end having a spherical surface for preventing stress concentrations in said layer at said other end, said spherical surface being spaced from said jacket; and
   e. means forming an energy-absorbing layer arranged in force-transmitting relationship between and contacting the inner surface of said jacket and the outer surface of said core.

7. A torsion damping arrangement comprising, in combination:
   a. an elongated generally tubular jacket;
   b. means at one end of said jacket for enabling the same to be secured to a support;
   c. means at the other end of said jacket for securing a work tool thereto;
   d. an elongated torsionally stiff core arranged in said tubular jacket; and
   e. means forming an energy-absorbing layer arranged in force-transmitting relationship between and contacting the inner surface of said jacket and the outer surface of said core, said layer being of rubber and of a generally elongated tubular shape.

8. An arrangement as claimed in claim 7, said rubber being vulcanized and having vulcanized bonding to said core and said jacket.

9. An arrangement as claimed in claim 7, wherein the arrangement is a boring bar.

10. A torsion damping arrangement, comprising, in combination:
   a. an elongated generally tubular jacket;
   b. means at one end of said jacket for enabling the same to be secured to a support;
   c. means at the other end of said jacket for securing a work tool thereto;
   d. an elongated torsionally stiff core arranged in said tubular jacket, with said core tapering toward said other end;
   e. means forming an energy-absorbing layer arranged in force-transmitting relationship between and contacting the inner surface of said jacket and the outer surface of said core; and
   f. means for permitting the injection of said layer into place between said jacket and said core.

11. An arrangement as claimed in claim 10, further comprising means for venting air from between said jacket and said core during injection of said layer into place.

12. An arrangement as claimed in claim 10, wherein said layer is vulcanized in place under pressure.

13. A torsion damping arrangement, comprising, in combination:
   a. an elongated generally tubular jacket;
   b. means at one end of said jacket for enabling the same to be secured to a support;
   c. means at the other end of said jacket for securing a work tool thereto;
   d. an elongated torsionally stiff core arranged in said tubular jacket, said core having an axial coolant-bore; and
   e. means forming an energy-absorbing layer arranged in force-transmitting relationship between and contacting the inner surface of said jacket and the outer surface of said core.

* * * * *